(12) United States Patent
Scancarello (10) Patent No.: US 10,151,663 B2
(45) Date of Patent: Dec. 11, 2018

(54) LEAK DETECTOR SENSOR SYSTEMS USING TAG-SENSITIZED REFRIGERANTS

(71) Applicant: Emerson Climate Technologies, Inc., Sidney, OH (US)

(72) Inventor: Marc Joseph Scancarello, Troy, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 77 days.

(21) Appl. No.: 15/265,157

(22) Filed: Sep. 14, 2016

(65) Prior Publication Data

US 2017/0074747 A1    Mar. 16, 2017

Related U.S. Application Data

(60) Provisional application No. 62/218,747, filed on Sep. 15, 2015.

(51) Int. Cl.
*G01M 3/22* (2006.01)
*C09K 5/04* (2006.01)
(Continued)

(52) U.S. Cl.
CPC ............ *G01M 3/226* (2013.01); *C09K 5/041* (2013.01); *C09K 5/042* (2013.01); *C09K 5/045* (2013.01);
(Continued)

(58) Field of Classification Search
CPC ...... G01M 3/22; G01M 3/226; C10M 171/00; C10M 171/008; F25B 49/00; F25B 49/005; C09K 5/04; C09K 5/045
(Continued)

(56) References Cited

U.S. PATENT DOCUMENTS 3,370,013 A    2/1968  Labac
3,412,570 A    11/1968 Pruett, Sr.
(Continued)

FOREIGN PATENT DOCUMENTS

DE    19545293 A1    6/1997
EP    1094100 A1    4/2001
(Continued)

OTHER PUBLICATIONS

International Search Report regarding Application No. PCT/US2016/051981, dated Nov. 21, 2016.
(Continued)

*Primary Examiner* — Eric S McCall
*Assistant Examiner* — Mohammed E Keramet-Amircola
(74) *Attorney, Agent, or Firm* — Harness, Dickey & Pierce, P.L.C.

(57) ABSTRACT

A leak detection system for a refrigerant circuit is provided. The refrigerant circuit is sealed and circulates a working fluid having a refrigerant (e.g., flammable refrigerant) and an oil. A reducing tag component is solubilized within the refrigerant. The leak detection system also includes a sensor for detecting the tag component if the refrigerant should leak from the refrigerant circuit. The sensor is highly sensitive to the tag component and thus enhanced detection is enabled. The tag component is stable in the working fluid and does not affect the flammability rating or performance of the refrigerant or oil. The tag component is present at a concentration of from about 50 ppm to about 35,000 ppm in the refrigerant. Methods of detecting leaks from refrigeration systems are also provided.

19 Claims, 2 Drawing Sheets

(51) Int. Cl.
*C10M 171/00* (2006.01)
*F25B 49/00* (2006.01)
*C10N 40/30* (2006.01)

(52) U.S. Cl.
CPC ....... *C10M 171/008* (2013.01); *F25B 49/005* (2013.01); *G01M 3/222* (2013.01); *C09K 2205/122* (2013.01); *C09K 2205/126* (2013.01); *C10N 2040/30* (2013.01); *F25B 2500/222* (2013.01)

(58) Field of Classification Search
USPC ..................................................... 73/40.5 R
See application file for complete search history.

(56) References Cited

U.S. PATENT DOCUMENTS

| | | | |
|---|---|---|---|
| 3,733,850 A * | 5/1973 | Olund | C10M 111/04 585/10 |
| 4,450,409 A | 5/1984 | Castleman et al. | |
| 4,507,558 A | 3/1985 | Bonne | |
| 4,556,496 A * | 12/1985 | Glova | C10M 169/04 508/405 |
| 4,862,731 A | 9/1989 | Gates | |
| 4,879,546 A | 11/1989 | Dunham et al. | |
| 4,948,683 A | 8/1990 | Picozzi et al. | |
| 5,149,453 A | 9/1992 | Parekh | |
| 5,351,037 A | 9/1994 | Martell et al. | |
| 5,357,782 A | 10/1994 | Henry | |
| 5,398,543 A | 3/1995 | Fukushima et al. | |
| 5,421,192 A | 6/1995 | Henry | |
| 5,562,406 A | 10/1996 | Ooka et al. | |
| RE35,370 E | 11/1996 | Henry | |
| RE35,395 E | 12/1996 | Henry | |
| 5,624,596 A | 4/1997 | Lunger et al. | |
| 5,674,000 A | 10/1997 | Kalley | |
| 5,681,984 A | 10/1997 | Cavestri | |
| 5,742,066 A | 4/1998 | Cavestri | |
| 5,918,475 A | 7/1999 | Sakakibara et al. | |
| 5,979,224 A | 11/1999 | Cavestri | |
| 6,070,454 A | 6/2000 | Cavestri | |
| 6,070,455 A | 6/2000 | Cavestri | |
| 6,079,252 A | 6/2000 | Tabler et al. | |
| 6,085,531 A * | 7/2000 | Numoto | F24F 11/0086 62/129 |
| 6,132,636 A | 10/2000 | Singh et al. | |
| 6,170,541 B1 | 1/2001 | Sanhaji | |
| 6,183,663 B1 | 2/2001 | Kalley et al. | |
| 6,530,264 B1 | 3/2003 | Rink et al. | |
| 6,595,039 B2 | 7/2003 | Brass | |
| 6,644,047 B2 | 11/2003 | Taira et al. | |
| 6,679,098 B2 | 1/2004 | Cardinale et al. | |
| 6,742,384 B2 | 6/2004 | Avila | |
| 7,910,627 B2 | 3/2011 | Toda et al. | |
| 8,020,585 B2 | 9/2011 | Shock et al. | |
| 8,188,323 B2 | 5/2012 | Leck et al. | |
| 8,236,251 B2 | 8/2012 | Toda et al. | |
| 8,418,530 B1 | 4/2013 | Scaringe et al. | |
| 2002/0152759 A1 | 10/2002 | Brass et al. | |
| 2002/0178738 A1* | 12/2002 | Taira | F24F 11/0086 62/129 |
| 2004/0003914 A1 | 1/2004 | Avila | |
| 2005/0042758 A1 | 2/2005 | Zyhowski et al. | |
| 2005/0086952 A1 | 4/2005 | Nonaka et al. | |
| 2005/0126263 A1 | 6/2005 | Avila | |
| 2005/0145822 A1 | 7/2005 | Drigotas et al. | |
| 2005/0211949 A1 | 9/2005 | Bivens et al. | |
| 2005/0230657 A1 | 10/2005 | Leck et al. | |
| 2005/0238533 A1 | 10/2005 | Jansen | |
| 2007/0138433 A1 | 6/2007 | Drigotas et al. | |
| 2009/0092517 A1 | 4/2009 | Kosaka et al. | |
| 2009/0107157 A1 | 4/2009 | Dube | |
| 2009/0119036 A1* | 5/2009 | Jayanth | F04B 49/065 702/60 |
| 2010/0244863 A1 | 9/2010 | Sasaki et al. | |
| 2011/0112814 A1 | 5/2011 | Clark | |
| 2011/0277541 A1 | 11/2011 | Kadle et al. | |
| 2012/0018667 A1* | 1/2012 | Krammer | C09K 5/044 252/68 |
| 2012/0060529 A1* | 3/2012 | Singh | A23G 9/00 62/129 |
| 2012/0090383 A1 | 4/2012 | Lopez et al. | |
| 2013/0025349 A1* | 1/2013 | Solomon | G01M 3/22 73/40.7 |
| 2014/0072467 A1* | 3/2014 | Wang | F04C 18/0253 418/55.5 |
| 2014/0260342 A1* | 9/2014 | Pham | F25B 45/00 62/56 |

FOREIGN PATENT DOCUMENTS

| | | |
|---|---|---|
| JP | S54113559 A | 9/1979 |
| JP | H1300170 A | 12/1989 |
| JP | H04073567 A | 3/1992 |
| JP | H04309770 A | 11/1992 |
| JP | H4369370 A | 12/1992 |
| JP | H5118720 A | 5/1993 |
| JP | H6137725 A | 5/1994 |
| JP | H6194254 A | 7/1994 |
| JP | H7294073 A | 11/1995 |
| JP | H10111061 A | 4/1998 |
| JP | H10170133 A | 6/1998 |
| JP | H10170134 A | 6/1998 |
| JP | H10253566 A | 9/1998 |
| JP | H11132595 A | 5/1999 |
| JP | H11325672 A | 11/1999 |
| JP | 2000088397 A | 3/2000 |
| JP | 2000146374 A | 5/2000 |
| JP | 2000146393 A | 5/2000 |
| JP | 2000320937 A | 11/2000 |
| JP | 2000337741 A | 12/2000 |
| JP | 2001134827 A | 5/2001 |
| JP | 2001221483 A | 8/2001 |
| JP | 2002174448 A | 6/2002 |
| JP | 2004036985 A | 2/2004 |
| JP | 2006266642 A | 10/2006 |
| JP | 2008215712 A | 9/2008 |
| JP | 2008249226 A | 10/2008 |
| JP | 2009092268 A | 4/2009 |
| JP | 2009103364 A | 5/2009 |
| JP | 2009236332 A | 10/2009 |
| JP | 2010101515 A | 5/2010 |
| JP | 2010101606 A | 5/2010 |
| JP | 2010133601 A | 6/2010 |
| JP | 2010230181 A | 10/2010 |
| WO | 2007114180 A1 | 10/2007 |
| WO | 2010007448 A1 | 1/2010 |
| WO | 2017048985 A1 | 3/2017 |

OTHER PUBLICATIONS

Written Opinion of the International Searching Authority regarding Application No. PCT/US2016/051981, dated Nov. 21, 2016.
Capone, Simone, et al. "Solid state gas sensors: state of the art and future activities." Journal of Optoelectronics and Advanced Materials 5.5 (2003): 1335-1348.
Kim, J. K., M. Kestursatya, and P. K. Rohatgi. "Tribological properties of centrifugally cast copper alloy-graphite particle composite." Metallurgical and Materials Transactions A 31.4 (2000): 1283-1293.
Tipton, Annie YuNing Hsu. "An Exploration of Chemical Agents Detection Using the Quantum Fingerprint Technology." Dissertation, University of Missouri, 2009.
MSA Gas Detection Handbook, MSA The Safety Company, Fifth Edition. pp. 1-139. ID 5555-312-MC (2007).
International Preliminary Report on Patentability regarding Application No. PCT/US2016/051981, dated Mar. 20, 2018.

* cited by examiner

LEAK DETECTOR SENSOR SYSTEMS USING TAG-SENSITIZED REFRIGERANTS

CROSS-REFERENCE TO RELATED APPLICATIONS

This application claims the benefit of U.S. Provisional Application No. 62/218,747, filed on Sep. 15, 2015. The entire disclosure of the above application is incorporated herein by reference.

FIELD

The present disclosure relates to heating, ventilation, air conditioning, and refrigeration systems with the ability to detect refrigerant leaks.

BACKGROUND

This section provides background information related to the present disclosure which is not necessarily prior art.

Many new low global warming potential (LGWP) refrigerants are currently being developed and incorporated into widespread applications, and many of these refrigerants are flammable. With the recent introduction of the new and flammable LGWP refrigerants used in heating, ventilation, air conditioning, and refrigeration (HVAC&R) systems, it is desired to have robust and cost effective sensors to detect refrigerant leaks in homes and businesses to assure public safety. Electronic leak detection systems are currently available to detect gases, including various refrigerant gases. Carbon monoxide detection in residential homes is an example.

Direct detection of a refrigerant gas, especially certain flammable refrigerant gases, can be unreliable. Certain flammable refrigerant gases are more difficult to predictably and accurately detect with sensors. Further, many conventional sensors may have detection limits that are undesirably high for a specific flammable refrigerant. If the detection limit is too high, there is a risk that the flammable refrigerant may leak from the sealed system and accumulate to a concentration above its lower flammability limit. Unfortunately, the sensitivity of most sensors varies depending upon the refrigerant type and is often not completely adequate. Moreover, sensor selectivity suffers from either being over-selective or under-selective, where "selectivity" as used herein refers to the ability of a sensor to detect a specific analyte of interest at low detection limits without being triggered by other innocuous compounds to indicate a false positive. For example, some sensors exhibit a false positive alarm in the presence of perfume or cologne. Conversely, some gases, in order to be adequately detected at appropriate detection limits, require a very specialized sensor, which adds technical complexity and cost that will hinder its use for the average consumer. Thus, the current and new LGWP flammable refrigerants are difficult to reliably and accurately detect at the detection limits required with the current sensing systems.

There remains a need to develop a sensor system for leak detection that is both highly sensitive with low detection limits, has adequate selectivity, is accurate in detecting the flammable refrigerant, robust and highly reliable, but which is also low cost. Furthermore, it would be desirable to have a universal leak detection system compatible with multiple different refrigerants. Such a system desirably has little dependence on the refrigerant type, so that multiple flammable LGWP refrigerant gases may be detected by a single leak detection system.

SUMMARY

This section provides a general summary of the disclosure, and is not a comprehensive disclosure of its full scope or all of its features.

The present disclosure provides a system for leak detection for a refrigeration or heat transfer system. A refrigerant leak detection system may thus comprise a refrigerant circuit that circulates a working fluid comprising a refrigerant and an oil. In certain aspects, the refrigerant is a flammable refrigerant. A reducing tag component is solubilized within the refrigerant. The reducing tag component substantially remains in the refrigerant rather than in the oil during a leak. In certain aspects, during leakage to atmosphere at atmospheric pressures, either the reducing tag component alone or the tag gas mixed with the refrigerant escapes into the air in the surrounding environment. The tag component is present at a concentration of greater than or equal to about 50 ppm to less than or equal to about 35,000 ppm in the refrigerant. The leak detection system also has a sensor associated with the refrigerant circuit configured to detect the reducing tag component if the refrigerant leaks from the refrigerant circuit. In certain aspects, the sensor has a sensitivity ratio for the reducing tag component of less than or equal to about 0.5 in air at a concentration of 100 ppm. In certain aspects, the sensor has a sensitivity ratio for the refrigerant of greater than about 0.5 in air at a concentration of 100 ppm.

In other variations, the present disclosure provides a leak detection system. The system may comprise a sealed refrigerant circuit comprising a compressor, a condenser, an expansion device, an evaporator in fluid communication with one another. The system includes a working fluid comprising a refrigerant and an oil, where the working fluid is circulated in the sealed refrigerant circuit. In certain aspects, the refrigerant is a flammable refrigerant. A reducing tag component is solubilized within the refrigerant and oil. The reducing tag component is selected from the group consisting of: butane, isobutane, propane, hydrogen, methane, decane, butylamine, acetone, dimethyl sulfide, dimethylamine, ethanol, ethyl acetate, heptane, hexane, isopropanol, methanol, methyl mercaptan, and combinations thereof. The system may also comprise a metal oxide semiconductor (MOS) sensor positioned in the vicinity of the sealed refrigerant circuit. The MOS sensor is configured to detect the reducing tag component if the refrigerant and reducing tag component leak from the sealed refrigerant circuit. The MOS sensor has a sensitivity ratio for the reducing tag component of less than about 0.5 in air at a concentration of 100 ppm. In certain aspects, the MOS sensor has a sensitivity ratio for the refrigerant of greater than about 0.5 in air at a concentration of 100 ppm.

In other aspects, the present disclosure provides a method of detecting leaks in a refrigerant circuit. The method includes circulating a working fluid in a refrigerant circuit. The working fluid comprises a refrigerant, an oil, and a reducing tag component solubilized within the refrigerant and that substantially remains in the refrigerant during the circulating and especially during leakage. In certain aspects, the refrigerant is a flammable refrigerant. For example, during leakage to the surrounding environment having atmospheric pressures, both the refrigerant and reducing tag component evaporate as a gas. However, the oil generally remains behind as a liquid, although it may be transported for short distances from the leak due to kinetic action and its solubility with the refrigerant, however it does not evaporate with the reducing tag component and the refrigerant. The tag component is present at a concentration of greater than or equal to about 50 ppm to less than or equal to about 35,000 ppm in the refrigerant. The method also includes detecting a leak of the refrigerant and reducing tag component with a metal oxide semiconductor (MOS) sensor associated with the refrigerant circuit. The sensor has a sensitivity ratio for the reducing tag component of less than about 0.5 in air at a concentration of 100 ppm. In certain aspects, the MOS sensor has a sensitivity ratio for the refrigerant of greater than about 0.5 in air at a concentration of 100 ppm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

As referred to herein, ranges are, unless specified otherwise, inclusive of endpoints and include disclosure of all distinct values and further divided ranges within the entire range. Thus, for example, a range of "from A to B" or "from about A to about B" is inclusive of A and of B. Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The present technology provides leak detection for a temperature and/or humidity regulating system, such as an HVAC&R system. The present disclosure provides a system for leak detection for a heating, ventilation, air conditioning, and refrigeration (HVAC&R) systems. As referred to herein, such systems are referred to as refrigeration systems or refrigeration circuits that circulate a refrigerant, however, in certain aspects, the use of such a term is also intended to encompass other heat transfer systems/circuits and heat transfer fluids. The present disclosure thus provides in certain aspects, a leak detection system for a sealed fluid circuit that is configured to detect any leaks of refrigerant (or other working heat transfer fluids). Such a system is particularly suitable for use with working fluids including a flammable refrigerant. A working fluid typically refers to a material having at least one refrigerant and at least one lubricating oil. Typical sealed refrigerant systems are discussed below. In accordance with certain principles of the present disclosure, the at least one refrigerant may be a flammable refrigerant that has a tag component solubilized within the refrigerant. The leak detection system also includes a sensor configured to detect the tag component when the refrigerant leaks from the conduit or other system component. The sensor has highly accurate and reliable detection capabilities for the tag component at low detection thresholds.

The present leak detection system adds specific "tag" components or indicator species or analyte present at very small concentrations to a host refrigerant to boost detectability of refrigerant leaks. Such a leak detection system further enhances safety, particularly when refrigerants used in the refrigeration system are flammable. While the refrigerants themselves may be detectable by a sensor, it has been found that many flammable refrigerants have relatively high detection thresholds or low sensitivity with many conventional sensors. Thus, providing a leak detection system capable of sensing the presence of a tag component at significantly lower concentration thresholds or detection limits provides an additional safety measure and safeguard against the flammable refrigerant leaking and accumulating to above its lower flammability limit concentration in confined spaces (e.g., indoors). As used herein, a "tag component" is an indicator species or analyte that is highly detectable by a specific sensor. The tag component is added to a host refrigerant, where the sensor has greater sensitivity to the tag component than to the host refrigerant. The tag component is selected in accordance with the present disclosure to have a greater affinity and selectivity (e.g., partition coefficient) to the refrigerant than to other components in the working fluid, including the oil. This is particularly important to ensure that the tag component remains solubilized within the refrigerant should it escape via a leak from the otherwise sealed system. Although most refrigerants are partially soluble in oils, during leakage to the surrounding environment at atmospheric pressures, the volatile refrigerants and reducing tag components will preferentially evaporate as gases into the surrounding environment (e.g., air) which allows detection. However, the oil generally remains behind as a liquid and although it may be transported for short distances from the leak due to kinetic action and its solubility with the refrigerant, it does not evaporate with the reducing tag component and the refrigerant.

In certain aspects, the sensor may be a gas detection sensor of any of the following types: metal oxide semiconductor (also known as "solid state"), catalytic bead, point infrared short path, open (long path) infrared, photoacoustic infrared, electrochemical for toxic gas detection, electrochemical for oxygen detection, thermal conductivity, photoionization (PID), non-dispersive infrared (NDIR), and the like. Sensors that are particularly suitable for sensing and detecting the tag components contemplated by the present disclosure include metal oxide semiconductor (MOS) sensors. The MOS sensor provides a higher level of sensitivity and greatly improved selectivity to reducing tag component species relative to sensitivity of sensors commonly used today to detect flammable refrigerant leaks. In accordance with certain aspects of the present teachings, MOS sensors are less dependent on the specific flammable refrigerant being detected than certain other sensing technologies and have a relatively low cost compared to current detectors commonly used in the art.

Figure 1:
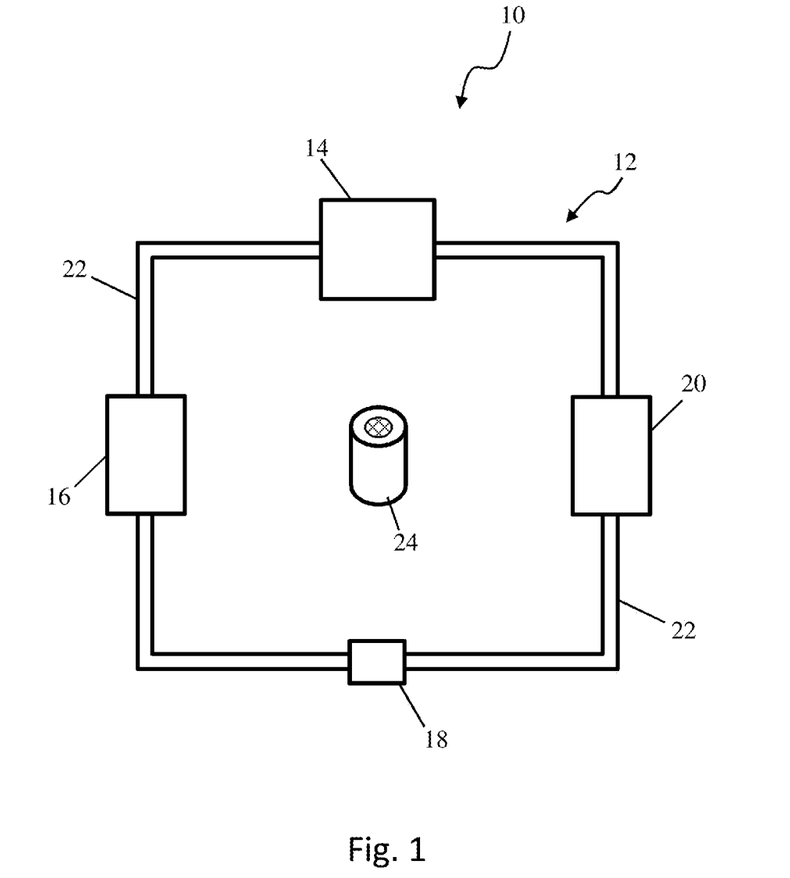
FIG. 1 is a schematic of an exemplary leak detection system including a refrigerant circuit according to certain aspects of the present technology.

With reference to FIG. 1, the present technology provides a leak detection system 10. In some embodiments, the system 10 is an HVAC&R system. The system 10 comprises a refrigerant circuit 12 that may include a compressor 14, a condenser 16, an expansion device 18, an evaporator 20, and one or more conduits 22 that fluidly couple and connect the compressor 14 to the condenser 16, the condenser 16 to the expansion device 18, the expansion device 18 to the evaporator 20, and the evaporator 20 to the compressor 14. As appreciated by those of skill in the art, various other components and equipment may be included in the refrigeration circuit (e.g., filters, valves, and the like), but are not shown in FIG. 1. The refrigerant circuit 12 is typically sealed, for example hermetically sealed or airtight, and circulates a working fluid and a tag component throughout the circuit 12. The working fluid comprises a refrigerant, such as a flammable refrigerant, and the tag component solubilized within the refrigerant, along with a lubricating oil. The working fluid circulates in the conduits 22 and passes through the various components. The lubricating oil is often circulated through only certain components of the refrigerant circuit 12, such as, for example, with the compressor 14 that may have an oil filter that separates the oil from the working fluid as the refrigerant and tag component exit the compressor and continue to circulate in the refrigerant circuit 12. Normally the oil circulates outside of the compressor at a concentration between about 0.1 to 5% by weight. This is due to partial chemical solubility between the oil and refrigerants and also because of inertial forces due to the pumping action of the compression mechanism. Thus, in certain designs, the working fluid may comprise lubricant oil and refrigerant through all regions and components within the refrigerant circuit 12, while in other designs, the oil is only present in the working fluid in select portions of the refrigerant circuit 12. Conventional oils include polyol ester oils (POE), polyalkylene glycol oils (PAG), polyalphaolefin oils (PAO), polyvinyl ether oils (PVE), mineral oil and alkyl benzene oils, by way of non-limiting example.

The present leak detection system serves to detect any leaks that may occur in the sealed refrigerant circuit 12. The system 10 further comprises a sensor 24 associated with the refrigerant circuit 12. The sensor 24 is configured to detect the tag component if and when a portion of the refrigerant leaks from a leak formed in the otherwise sealed refrigerant circuit 12. As will be described in greater detail below, the sensor 24 is placed within the vicinity of refrigerant circuit 12, for example, in an indoor or enclosed area where flammable refrigerant may accumulate if a leak should occur.

Although any refrigerant known in the art can be used in the working fluid, in various embodiments, the refrigerant is a flammable refrigerant. Flammable refrigerants pose greater risks than non-flammable refrigerants, especially in confined spaces and indoor applications. As such, detecting leaking flammable refrigerants can prevent adverse effects that may result from a leak. Furthermore, it has been observed that flammable refrigerants have relatively poor sensitivity or higher detection limits with conventional sensors, especially lower cost conventional sensors. As used herein, flammable refrigerants are refrigerants with an American Society of Heating, Refrigerating and Air-conditioning Engineers, Inc. ("ASHRAE") safety class designation, also referred to herein as a "flammability classification," of A2L, B2L, A2, B2, A3, or B3 in accordance with ASHRAE Standard 34. A flammable refrigerant can be a flammable refrigerant composed of a single flammable chemical species or a mixture or blend of at least one non-flammable refrigerant with at least one flammable refrigerant, or a blend of two or more flammable refrigerants, optionally combined with one or more non-flammable refrigerants. In certain alternative variations, the refrigerant may be a non-flammable refrigerant that is high in Global Warming Potential (GWP), so there is a general concern to prevent leaking to avoid detrimental environmental impact.

The following categories of refrigerants include flammable refrigerants for which the leak detection systems may be used in accordance with certain aspects of the present disclosure. Flammable refrigerants may generally be gases in the methane series, ethane series, ethers, propane, organic compounds, including unsaturated organic compounds, inorganic compounds, and zeotrope mixtures. More specifically, flammable refrigerants may include: hydrocarbons, hydrochlorofluorocarbons, hydrofluorocarbons, hydrochlorocarbons, hydrofluorocarbons, and hydrofluoroolefins, by way of example. The leak detection by the principles of the present disclosure is particularly useful for flammable hydrofluorocarbon refrigerants, and/or flammable hydrofluoroolefin refrigerants or any combinations thereof.

Non-limiting examples of flammable refrigerants include the following refrigerants: saturated hydrocarbons, like methane (R50), ethane (R170), propane (R290), butane (R600), pentane (R601), 2-methylpropane (R600a), 2-methylbutane (R601a), unsaturated hydrocarbons, such as ethene (R1150), propene (R1270), or heteroatom substituted hydrocarbons, such as methoxymethane (RE170), and methyl formate (R611), hydrochlorocarbons, hydrochlorofluorocarbons, such as 1-chloro-1,1-difluoroethane (R142b), saturated hydrofluorocarbons, like difluoromethane (R32), difluoroethane (R152a), fluoroethane (R161), 1,1,1-trifluoroethane (R143a), 1,1-difluoroethane (R152a), 1,1,1-trifluoroethane (R143a), hydrofluoroolefins (HFO) refrigerants include 3,3,3,-trifluoropropene (HFO-1234zf), HFO-1234 refrigerants like 2,3,3,3,-tetrafluoropropene (HFO-1234yf), 1,2,3,3,-tetrafluoropropene (HFO-1234ze (E)), cis- and trans-1,3,3,3,-tetrafluoropropene (HFO-1234ye(E),(Z)), pentafluoropropenes (HFO-1225) such as 1,1,3,3,3, pentafluoropropene (HFO-1225zc) or those having a hydrogen on the terminal unsaturated carbon such as 1,2,3,3,3, pentafluoropropene (HFO-1225ye(Z), fluorochloropropenes such as trifluoro,monochloropropenes (HFO-1233) like $CF_3CCl=CH_2$ (HFO-1233xf) and $CF_3CH=CHCl$ (HFO-1233zd), hydrogen (R702), ammonia (R717), azeotropes, such as, for example, R403A, R406A, R411A, R411B, R412A, R413A, R415A, R415B, R418A, R419A, R419B, R429A, R430A, R431A, R432A, R433A, R433B, R433C, R435A, R436A, R436B, R439A, R440A, R441a, R443A, R444A, R444B, R445A, R446A, R447A, R448A, R449A, R450A, R451A, R451B, R452A, R510A, R511A, R512A, R513A, and combinations thereof. For example, certain flammable refrigerants may include a hydrofluoroolefin (HFO) Blend 1 (a mixture of difluoromethane (R32), 1,2,3,3,-tetrafluoropropene (HFO-1234ze (E)), 3,3,3,-trifluoropropene (HFO-1234zf), and difluoroethane (R152a)) or a hydrofluoroolefin (HFO) Blend 2 (a mixture of difluoromethane (R32), trans 1-chloro-3,3,3-trifluoropropene, HFO-1233zd(E), and 3,3,3,-trifluoropropene (HFO-1234zf)). In certain variations, the flammable refrigerant is selected from difluoromethane (R32).

As noted above, in alternative variations, the refrigerant may not be flammable, but it may be desirable to detect leaks for other reasons than safety (e.g., where the refrigerant contains one or more high GWP compounds). A refrigerant that has a high GWP is one where the Global Warming Potential is 150 or higher. Thus, in certain variations, exemplary refrigerants include those selected from the group consisting of: saturated or unsaturated fluorocarbons, chlorofluorocarbons, hydrochlorofluorocarbons, fluoroethers, hydrocarbons, carbon dioxide, ammonia, dimethyl ether, and combinations thereof. Notably, some of the flammable refrigerants outlined above may also be included in the exemplary lists of classes of refrigerants discussed above. One example of a non-flammable high GWP compound is R410A (a mixture of difluoromethane (R32) and pentafluoroethane (R125)).

As described above, a tag component or indicator species is introduced into the flammable refrigerant that forms the working fluid when combined with the lubricant oil. The tag component is soluble within the refrigerant and the refrigerant is only partially soluble in the oil depending upon internal system temperature and pressures. In various aspects, given the higher vapor pressures of the tag gas component, the tag gas component has an affinity for and partitions into the refrigerant rather than the oil, especially during leakage to atmospheric pressures. In this manner, the tag component solubilized within the flammable refrigerant substantially remains in the flammable refrigerant during leakage rather than in the oil, which notably remains a liquid even during a leak. During system operation prior to a leak, the tag gas circulates within the refrigerant circuit (including the compressor, condenser, expansion device, evaporator, and conduits fluidly coupling them together). By "substantially remains" it is meant that at least about 90% by weight or mass of the tag component remains in the refrigerant through circulation of the working fluid within the refrigeration circuit, optionally greater than or equal to about 95% by weight, optionally greater than or equal to about 96% by weight, optionally greater than or equal to about 97% by weight, optionally greater than or equal to about 98% by weight, optionally greater than or equal to about 99% by weight, and in certain variations, greater than or equal to about 99.5% by weight of the tag component remains in the refrigerant of the working fluid. Selecting a tag component with this high solubility, relatively high vapor pressures, and preferential partitioning into refrigerant ensures that any refrigerant that leaks from the refrigeration circuit has a sufficient concentration of tag component to be detected by the associated sensor.

In certain aspects, the tag component is a reducing tag component. A reducing tag component means that the compound is capable of being chemically reduced in electronic charge by a sensor for detecting the presence of the tag component, for example, by a metal oxide semiconductor sensor. In this manner, as will be discussed further below, the sensor is capable of detecting certain reducing tag components at significantly reduced detection thresholds than the refrigerant. Thus, the sensor has a desirably low sensitivity ratio for the tag component, but a higher sensitivity ratio for the refrigerant, as will be described in greater detail below.

As noted above, when the system 10 includes an oil lubricant, the tag component has a higher solubility in the refrigerant than in the oil lubricant during leakage to an external environment at atmospheric conditions, including atmospheric pressure, which ensures that the tag component remains in the refrigerant and does not transfer from the refrigerant to the lubricant oil. In various aspects, the tag component is selected so that it is highly soluble within a refrigerant. An important aspect of the inventive technology is that at atmospheric leak conditions, the tag gas component evaporates and becomes airborne. The solubility of the tag component in the oil (represented by the oil circulation rate outside the compressor combined with the partial solubility of the refrigerant in the oil) will be overwhelmed by low pressure-driven evaporation out of the oil. The oil will be left behind during a leak with very little gas left remaining in the oil. Solubility of gases in gases is usually much better than gases in liquids (oil in this case). The tag gas components are thus essentially infinitely soluble in the gaseous refrigerants. In certain aspects, a tag component that is highly soluble exhibits a solubility of greater than or equal to about 98% by volume in the refrigerant through the range of operating envelope temperatures and pressures within the refrigeration circuit. Notably, as used herein, when measuring gas in another gas (e.g., leaking gas in air (whether the tag component gas or the host refrigerant gas) it is measured in terms of volume percentages/parts per million on a volume basis (PPMs or PPMVs). Gases contained within liquids (for example, tag gas components soluble within liquid oils or tag gas components within liquid refrigerant) are measured in terms of weight percent/parts per million on a weight basis (also referred to as a PPMs or PPMWs). Also note, the amount of refrigerant or oil charged in a production HVAC system is expressed in terms of weight percent, because the refrigerant is charged in the liquid state and thus calculated on the basis of weight.

In certain aspects, the tag component and its percent concentration are selected so that it does not do one or more of the following: (i) chemically react with the refrigerant, (ii) adversely affect the capacity and efficiency of the system 10, (iii) adversely affect the lubrication of critical moving parts in system components, (iv) adversely affect the solubility or miscibility of the refrigerant within lubricating oils that may be present within the system 10, (v) chemically degrade the materials of which the conduit 22, compressor 14 or other system components are formed, (vi) create a new chemical compound that can degrade the performance of the system 10, (vii) adversely affect the dielectric properties of the refrigerant or lubricating oils that may be present, and/or (viii) decrease the thermal transfer properties of the refrigerant. In certain variations, the tag component is selected to fulfill each of the criteria (i)-(viii). In certain embodiments, the tag component comprises a plurality of tag components that are characterized by the above properties. Thus, in certain aspects, the reducing tag component may remain stable and inert for at least about 500 hours of refrigerant circuit operation and does not adversely affect the working fluid's cooling or heating performance, optionally through at least about 1,000 hours of operation, optionally through at least about 1,500 hours of operation, and preferably in certain embodiments, through at least about 2,000 hours or longer of refrigerant circuit operation processing the working fluid comprising the tag component.

As noted above, the tag components are selected to be not only highly compatible with the flammable refrigerant(s), but also to be a highly detectable reducing analyte for a specific type of sensor. In other words, sensors (such as MOS sensors) are highly sensitive to select reducing tag components. In various embodiments, the reducing tag component is selected from the group consisting of: butane, isobutane, propane, hydrogen, methane, decane, butylamine, acetone, dimethyl sulfide, dimethylamine, ethanol, ethyl acetate, heptane, hexane, isopropanol, methanol, methyl mercaptan, and combinations thereof. In certain preferred aspects, the reducing tag component is selected from the group consisting of butane, isobutane, propane, and combinations thereof, which are particularly suitable for use with the sensor described below.

Hydrocarbons have been used conventionally at relatively low amounts to alter oil viscosity and to assist oil return in systems using immiscible oils with hydrofluorocarbons (HFCs) refrigerants. When used to supplement oil compositions for viscosity or solubility enhancement, hydrocarbons are typically added in concentrations of at least about 3%. In contrast, and as discussed further below, the tag components suitable for the present technology are used as an indicator species and therefore are present in relatively low amounts. For example, tag components may be present in total concentrations of greater than or equal to about 10 parts per million (ppm) to less than or equal to about 35,000 ppm in the refrigerant such that the tag component does not affect the flammability classification rating of the host refrigerant (classification as defined by ASHRAE Standard 34). The parts per million are by volume percentage, as noted above, because the tag component is measured as a gas in a refrigerant gas. The flammability classification of the host refrigerant will change or the properties of the host refrigerant gas will change (e.g., excessive glide, pressures, fractionation, heat capacity, etc.) if too much tag gas component is added. In various embodiments, the tag component has a concentration in the refrigerant of less than or equal to about 35,000 ppm, less than or equal to about 30,000 ppm, less than or equal to about 25,000 ppm, less than or equal to about 20,000 ppm, less than or equal to about 10,000 ppm, less than or equal to about 5000 ppm, less than or equal to about 1000 ppm, less than or equal to about 500 ppm, or less than or equal to about 200 ppm, where the tag component does not affect the flammability classification rating of the refrigerant or the performance of the refrigerant. In certain variations, the tag component may be present at greater than or equal to about 100 parts per million (ppm) to less than or equal to about 10,000 ppm in the refrigerant, optionally greater than or equal to about 100 parts per million (ppm) to less than or equal to about 1,000 ppm in the refrigerant, and in other variations, optionally greater than or equal to about 500 parts per million (ppm) to less than or equal to about 5,000 ppm.

In certain preferred variations, the working fluid has a reducing tag component selected from the group consisting of: isobutane, butane, propane, and combinations thereof and a flammable refrigerant that optionally comprises one or more of the following individual gases or blends: R32, R1234ze(E), R1234yf, R142b, R143a, R152a, R170, RE170, R717, R1150, R1270, R1233zd(E), R403A, R406A, R411A, R411B, R412A, R413A, R415A, R415B, R418A, R419A, R419B, R429A, R430A, R431A, R432A, R433A, R433B, R433C, R435A, R436A, R436B, R439A, R440A, R441a, R443A, R444A, and/or R445A. It is understood that any of these flammable refrigerants may be combined (blended) with other flammable or non-flammable gases. Furthermore, it should be appreciated that this is not an exhaustive list, because there is an ongoing effort to add new refrigerants, both flammable and non-flammable in ASHRAE Std. 34. In certain aspects, the working fluid has a reducing tag component selected from the group consisting of: isobutane, butane, propane, and combinations thereof, and a flammable refrigerant that is selected from hydrocarbons, ammonia, R32, HFO-1234yf (R1234yf), or a blend of R32 and one or more hydrofluoroolefins (HFO) (e.g., HFO-1234ze(E) (R1234ze(E)), HFO-1234yf (R1234yf), HFO-1123 (R1123), HFO-1233 (R1233), and the like), R125, R134a, and the like.

Such a refrigerant is particularly compatible with these specific tag components. Furthermore, the sensor is highly sensitive to the particular reducing tag components of isobutane, butane, propane, and combinations thereof. In certain variations, the working fluid consists essentially of one or more oils, the reducing tag component selected from the group consisting of: isobutane, butane, propane, and combinations thereof, and the refrigerant includes a refrigerant or a blend of refrigerants including a refrigerant selected from the group consisting of: R32, R1234ze(E), R1234yf, R142b, R143a, R152a, R170, RE170, R717, R1150, R1270, R1233zd(E), R403A, R406A, R411A, R411B, R412A, R413A, R415A, R415B, R418A, R419A, R419B, R429A, R430A, R431A, R432A, R433A, R433B, R433C, R435A, R436A, R436B, R439A, R440A, R441a, R443A, R444A, and/or R445A.

The sensor 24 is thus configured to detect the tag component if and when the flammable refrigerant leaks from the otherwise sealed refrigerant circuit 12 that has developed a leak. In particular, in certain preferred aspects, the sensor 24 is a solid state gas sensor, such as a metal oxide semiconductor (MOS) sensor. MOS sensors generally include an alumina or ceramic substrate with a heating element positioned on a first side of the substrate. An electrode is positioned on a second opposing side of the substrate. Positioned on the electrode is a layer of a gas-sensitive metal oxide semiconductor. Non-limiting examples of gas-sensitive metal oxide semiconductors provided in MOS sensors include ZnO, CuO, NiO, $SnO_2$, $V_2O_5$, $TiO_2$, $In_2O_3$, $Cr_2O_3$, and $WO_3$. Typically, a filter is positioned above the metal oxide semiconductor layer. MOS sensors detect gases via an interaction of the gas with a metal oxide surface, which causes changes in electrical resistance.

The sensor 24 is positioned outside of or near the refrigerant circuit 12. In various embodiments, the sensor 24 is positioned within a vicinity of the refrigerant circuit 12 at a distance from the refrigerant circuit 12 of less than or equal to about 100 feet, less than or equal to about 75 feet, less than or equal to about 50 feet, less than or equal to about 25 feet, less than or equal to about 10 feet, less than or equal to about 5 feet, and in certain variations, less than or equal to about 1 foot. Notably, the sensor 24 associated with the refrigerant circuit 12 may be placed in a location that is enclosed or indoors, where the concentration of any leaking refrigerant and tag component will be greatest.

The MOS sensor 24 detects the tag component itself and then provides a notification. The notification can be an alert or notice provided on a display panel, an audible alarm, or a combination thereof. In some embodiments, the sensor detects both the host refrigerant and the tag component, wherein the sensor's sensitivity is "boosted" or enhanced by the presence of the tag component, which is more highly detectable relative to the refrigerant. As noted above, tag components that are suitable for the current system 10 are reducing gases that react with the metal oxide semiconductor layer of MOS sensors. Such gases include butane, isobutane, propane, hydrogen, methane, decane, butylamine, acetone, dimethyl sulfide, dimethylamine, ethanol, ethyl acetate, heptane, hexane, isopropanol, methanol, methyl mercaptan, or mixtures or blends thereof. As noted above, butane, isobutene, and propane are particularly suitable for detection by MOS sensors. Depending upon type of refrigerant and lubricant provided in a system, an individual tag component or a blend or mixture thereof may be used. For example, in various embodiments, the tag component is individually butane, isobutane, or propane, a combination of two or three of these tag components depending upon the application, choice of sensor model, host refrigerant, lubricant type, etc.

By solubilizing a tag component within a refrigerant, both the sensitivity and selectivity of the sensor 24 will be improved relative to detection of the refrigerants itself. Therefore, a single sensor 24 may useful in regard to multiple refrigerants due to the presence of the tag component. Nonetheless, the tag component is provided in trace amounts, i.e., concentrations measured in parts per million (ppm), so as to not affect the ASHRAE Std. 34 refrigerant classification (flammability rating, toxicity rating or the specified chemical composition) and also to not adversely affect the refrigerant's cooling or heating performance. In other words, these low concentrations of tag components do not increase the refrigerant's potential for igniting.

As discussed above, the tag component used in an HVAC&R system ideally satisfies many constraints, because the working fluid must reliably perform in a hermetically sealed environment for many years. For example, in certain aspects, the tag component should not adversely create deposits on internal system components, while having an appropriate melting point, an appropriate boiling point, a suitable vapor pressure, while being safe to use at the requisite concentration levels (within Operational Exposure Limits (OEL), is not be a known carcinogen, etc.), not chemically reacting to develop other detrimental chemical compounds (passing ASHRAE 97 testing), not degrading the materials-of-construction in an HVAC&R system, being more soluble in the host refrigerant than a lubricant present in the system, so that leaking refrigerant carries the tag component with it for detection if it should exit the sealed refrigeration system. Importantly, the tag component is soluble in the host refrigerant so that is travels with the refrigerant as it escapes or leaks. Moreover, the type of filter drier (more precisely, the composition of the filter drier media) is desirably chosen so that it does not inadvertently remove or absorb the tag component out of the host refrigerant. The choice of filter drier depends upon the host refrigerant type, the type of tag component, the oil grade and the particular HVAC&R application conditions.

In certain variations, the reducing tag component may be compatible and stable within multiple distinct flammable refrigerants. Thus, a single tag component may be used in distinct refrigerant systems with distinct refrigerants and oils. In this manner, a universal leak detection system can be used with distinct refrigerant working fluids and refrigeration circuits. The leak detection system may include a sensor and the reducing tag component analyte to which the sensor has low detection limits and high sensitivity. The reducing tag component can be added to distinct flammable refrigerants and working fluids, assuming it fulfills the compatibility criteria discussed above, but is still detectable at low concentration thresholds by the same type of sensor. In this manner, the leak detection system may be versatile and used with different refrigerant systems.

Table 1, shown below, highlights an MOS sensor's (from FiS, Inc., Japan) higher sensitivity to certain analyte compounds over others. More specifically, Table 1 shows a ratio of the electrical resistance (R) detected on the sensor for various analytes tested at various concentrations and the resistance detected on the sensor due to air (Ro), which is a reference resistance. This ratio, R/Ro (or R/Rair), is referred to herein as a "sensitivity ratio." The data of Table 1 from FiS for the MOS sensor is presented as a graph in FIG. 2, where the y-axis the sensitivity ratio, R/Rair, and the x axis is the concentration of various gases in ppm. In certain aspects, the R/Ro sensitivity ratio is less than or equal to about 0.5 for a concentration of greater than 100 ppm in air to have acceptable sensitivity, optionally less than or equal to about 0.4, optionally less than or equal to about 0.3, optionally less than or equal to about 0.2, but ideally the sensitivity ratio is less than or equal to about 0.1 for a concentration of greater than 100 ppm in air to provide robust detection of a leaking tag component. Notably, the sensitivity ratio of the sensor for the refrigerant is typically greater than 0.5 for a concentration of greater than 100 ppm in air and in some cases, greater than or equal to about 0.6.

For example, difluoromethane, as can be seen below, an MOS sensor has a sensitivity ratio at 100 ppm of 0.68 for R32 (difluoromethane) in air and a sensitivity ratio at 100 ppm of 0.64 for R410A (a mixture of difluoromethane (R32) and pentafluoroethane (R125)) in air, while R600a (isobutene) in air has a sensitivity ratio at 100 ppm of 0.29, R600 (butane) in air of 0.28, and R290 (propane) in air of 0.21 for the same MOS sensor.

the sensor is advantageously very sensitive to the tag component. Therefore, in various embodiments, the sensor has a positive sensitivity ratio of less than or equal to about 0.5, less than or equal to about 0.4, less than or equal to about 0.3, less than or equal to about 0.2, or less than or equal to about 0.1 for the tag component that is solubilized in the refrigerant at a positive concentration of less than or equal to about 35,000 ppm, less than or equal to about 20,000 ppm, less than or equal to about 10,000 ppm, less than or equal to about 5000 ppm, less than or equal to about 1000 ppm, or less than or equal to about 100 ppm in air. In certain embodiments, the sensor has a sensitivity ratio of less than or equal to about 0.3 when the tag component is present in the refrigerant at a concentration of about 100 ppm in air, about 500 ppm, about 1,000 ppm, about 2,000 ppm, about 3,000 ppm, about 5,000 ppm, about 10,000 ppm, about 15,000 ppm or about 20,000 ppm. In another embodiment, the sensor has a sensitivity ratio of less than or equal to about 0.1 when the tag component is present in the refrigerant at a concentration of greater than or equal to about 100 ppm to less than or equal to about 20,000 ppm, from greater than or equal to about 100 ppm to less than or equal to about 10,000 ppm, from greater than or equal to about 100 ppm to less

TABLE 1

Sensor R/R(air) sensitivity ratios for exemplary gases at various concentrations.

| ppm | R410A | R404A | R407C | R32 | R22 | R-134A | R-600a | R600 | R-290 | HFO-1234yf |
|---|---|---|---|---|---|---|---|---|---|---|
| 0 | 1 | 1 | 1 | 1 | 1 | 1 | 1 | 1 | 1 | 1 |
| 100 | 0.64 | 0.87 | 0.6 | 0.68 | 0.74 | 0.56 | 0.29 | 0.28 | 0.21 | 0.74 |
| 1000 | 0.19 | 0.47 | 0.14 | 0.15 | 0.49 | 0.19 | 0.13 | 0.12 | 0.11 | 0.29 |
| 5000 | 0.06 | 0.18 | 0.04 | 0.03 | 0.32 | 0.12 | 0.1 | 0.1 | 0.08 | 0.11 |
| 10000 | 0.03 | 0.1 | 0.02 | 0.02 | 0.25 | 0.09 | — | — | — | 0.06 |
| 20000 | 0.01 | 0.05 | 0.01 | 0.01 | — | — | — | — | — | 0.03 |

Figure 2:
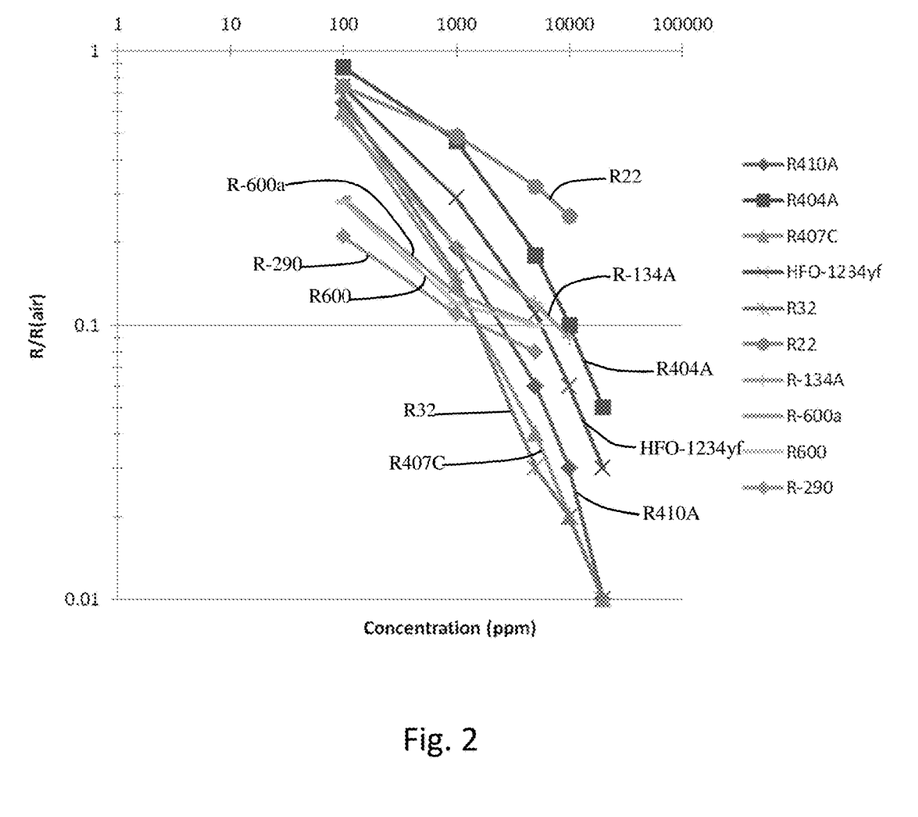
FIG. 2 is a graph of sensor sensitivity ratio versus concentration of various target analytes, including refrigerants and tag components, for a metal oxide semiconductor (MOS) sensor.

Table 1 and FIG. 2 include sensitivity ratios for R410A (a mixture of R32 and R125), R404A (a mixture R32, R143A (1,1,1-trifluoroethane), and R134A (1,1,1,2-tetrafluoroethane), R407C (a mixture R32, R125, and R134A), HFO-1234yf, R32, chlorodifluoromethane (R22), 1,1,1,2-tetrafluoroethane (R134A), R600A, R600, and R290. Flammable materials among these include R32, R-600a, R600, and HFO1234yf. The data provided in Table 1 and FIG. 2 highlight the sensor's higher sensitivity toward certain gases over others. In particular, R32 and HFO-1234yf (two flammable, LGWP refrigerant gases) have sensitivity ratios of 0.68 and 0.74, respectively, at a concentration of 100 ppm in air. In contrast, the sensor has a sensitivity ratio of 0.29 in regard to 100 ppm R600a (isobutane). Therefore, the sensor is more sensitive to R600a than it is to the refrigerants R32 and HFO-1234yf. Also, the sensor demonstrates a sensitivity ratio of 0.64 in regard to R410A, a very common refrigerant, meaning the refrigerant is less likely to be detected than isobutane (R600a). Like isobutane, the sensor was sensitive against R600 (butane) and R-290 (propane), which provided sensitivity ratios of 0.28 and 0.21, respectively, at 100 ppm. Therefore, isobutane, butane, and propane can be detected at lower concentrations or lower detection limits that many common refrigerants, which is an important advantage of incorporating the tag components. Nonetheless, even if the host refrigerant is detectable by a specific sensor (albeit in a less sensitive manner), the tag component will increase or boost the sensitivity of the leaking refrigerant, thus enhancing early detection of leaks and therefore safety.

Because the tag component is solubilized in the refrigerant at low concentrations, i.e., less than about 35,000 ppm, than or equal to about 5,000 ppm, or from greater than or equal to about 100 ppm to less than or equal to about 1,000 ppm. In embodiments where the tag component is used functionally in the base refrigerant, such as when the tag component is part of a normative composition specified by ASHRAE Std. 34, then the concentration of the tag component complies with ASHRAE Std. 34 refrigerants.

The present disclosure also contemplates a method of detecting leaks in a refrigerant circuit. The method may include circulating a working fluid in a refrigerant circuit, where the working fluid comprises an oil, a flammable refrigerant, and a reducing tag component solubilized within the flammable refrigerant. The reducing tag component substantially remains in the flammable refrigerant during the circulating of the working fluid in the refrigerant. The tag component is present at a concentration of greater than or equal to about 50 ppm to less than or equal to about 35,000 ppm in the refrigerant. The refrigerant circuit may be regularly monitored during operation and use. The method includes detecting a leak of the flammable refrigerant and reducing tag component with a metal oxide semiconductor (MOS) sensor associated with the refrigerant circuit, where the sensor has a sensitivity ratio for the reducing tag component of less than about 0.5 in air at a concentration of 100 ppm. As noted above, the MOS sensors are highly sensitive to select tag components that are reducing. The sensor may have a sensitivity ratio for the flammable refrigerant of greater than about 0.5 in air at a concentration of 100 ppm flammable refrigerant. The sensor may be connected to a processor, computing unit, or alarm system for providing notifications, as discussed above. The detecting step may thus include generating an alert or alarm (e.g., visual or auditory) that provides notification of the leak.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A refrigerant leak detection system comprising:
    a refrigerant circuit that circulates a working fluid comprising a flammable refrigerant and an oil;
    a reducible tag component solubilized within the refrigerant that substantially remains in the refrigerant rather than in the oil, wherein the tag component is present at a concentration of greater than or equal to about 50 ppm to less than or equal to about 35,000 ppm in the flammable refrigerant; and
    a sensor associated with the refrigerant circuit configured to detect the reducible tag component if the refrigerant leaks from the refrigerant circuit, wherein the sensor has a sensitivity ratio for the reducible tag component of less than about 0.5 in air at a concentration of 100 ppm.

2. The system according to claim 1, wherein the refrigerant circuit comprises a compressor, an evaporator, an expansion device, and a condenser.

3. The system according to claim 1, wherein the reducible tag component remains stable and inert for at least 500 hours of refrigerant circuit use.

4. The system according to claim 1, wherein the reducible tag component is selected from the group consisting of: butane, isobutane, propane, hydrogen, methane, decane, butylamine, acetone, dimethyl sulfide, dimethylamine, ethanol, ethyl acetate, heptane, hexane, isopropanol, methanol, methyl mercaptan, and combinations thereof.

5. The system according to claim 1, wherein the reducible tag component is selected from the group consisting of: isobutane, butane, propane, and combinations thereof.

6. The system according to claim 1, wherein the reducible tag component comprises at least one hydrocarbon having from 1 to 4 carbon atoms.

7. The system according to claim 1, wherein the sensor is a metal oxide semiconductor sensor.

8. The system according to claim 1, wherein the sensor has a sensitivity ratio for the reducible tag component of less than about 0.1 in air at a concentration of 100 ppm.

9. The system according to claim 1, wherein the sensor has a sensitivity ratio for the reducible tag component of less than about 0.3, when the reducible tag component is present in the refrigerant at a concentration of greater than or equal to about 100 ppm to less than or equal to about 1,000 ppm.

10. The system according to claim 1, wherein the sensor is positioned at a maximum distance from the refrigerant circuit of less than or equal to about 50 feet.

11. The system according to claim 1, wherein the reducible tag component is selected from the group consisting of: isobutane, butane, propane, and combinations thereof and the refrigerant is selected from the group consisting of: R32, R1234ze(E), R1234yf, R142b, R143a, R152a, R170, RE170, R717, R1150, R1270, 1233zd(E), R403A, R406A, R411A, R411B, R412A, R413A, R415A, R415B, R418A, R419A, R419B, R429A, R430A, R431A, R432A, R433A, R433B, R433C, R435A, R436A, R436B, R439A, R440A, R441a, R443A, R444A, R445A, combinations, and blends thereof.

12. The system according to claim 1, wherein the working fluid consists essentially of one or more oils, the reducible tag component selected from the group consisting of: isobutane, butane, propane, and combinations thereof and the refrigerant is selected from the group consisting of: R32, R1234ze(E), R1234yf, R142b, R143a, R152a, R170, RE170, R717, R1150, R1270, 1233zd(E), R403A, R406A, R411A, R411B, R412A, R413A, R415A, R415B, R418A, R419A, R419B, R429A, R430A, R431A, R432A, R433A, R433B, R433C, R435A, R436A, R436B, R439A, R440A, R441a, R443A, R444A, R445A, combinations, and blends thereof.

13. The system according to claim 1, wherein the sensor is
    a metal oxide semiconductor (MOS) sensor.

14. The system according to claim 13, wherein the MOS sensor has a sensitivity ratio of less than about 0.1 for the reducible tag component.

15. The system of claim 1, wherein the refrigerant circuit is a sealed refrigerant circuit comprising a compressor, a condenser, an expansion device, and an evaporator in fluid communication with one another.

16. A method of detecting leaks in a refrigerant circuit comprising:
    circulating a working fluid in a refrigerant circuit, where the working fluid comprises a flammable refrigerant, an oil, and a reducible tag component solubilized within the flammable refrigerant and that substantially remains in the flammable refrigerant during the circulating, wherein the tag component is present at a concentration of greater than or equal to about 50 ppm to less than or equal to about 35,000 ppm in the flammable refrigerant; and
    detecting a leak of the flammable refrigerant and reducible tag component with a metal oxide semiconductor (MOS) sensor associated with the refrigerant circuit, wherein the sensor has a sensitivity ratio for the reducible tag component of less than about 0.5 in air at a concentration of 100 ppm.

17. The method of claim 16, wherein sensor has a sensitivity ratio for the reducible tag component of less than about 0.1 in air at a concentration of 100 ppm.

18. The method of claim 16, wherein the reducible tag component is selected from the group consisting of: butane, isobutane, propane, hydrogen, methane, decane, butylamine, acetone, dimethyl sulfide, dimethylamine, ethanol, ethyl acetate, heptane, hexane, isopropanol, methanol, methyl mercaptan, and combinations thereof.

19. A refrigerant leak detection system comprising:
    a refrigerant circuit that circulates a working fluid comprising a flammable refrigerant and an oil;
    a reducible tag component solubilized within the refrigerant that substantially remains in the refrigerant rather than in the oil, wherein the tag component is present at a concentration of greater than or equal to about 50 ppm to less than or equal to about 35,000 ppm in the flammable refrigerant; and a sensor associated with the refrigerant circuit configured to detect the reducible tag component if the refrigerant leaks from the refrigerant circuit, wherein the sensor has a sensitivity ratio for the reducible tag component of less than about 0.3 in air at a concentration of 100 ppm.

* * * * *